Patented Mar. 6, 1928.

1,661,526

UNITED STATES PATENT OFFICE.

ADOLF BECK, OF BITTERFELD, GERMANY, ASSIGNOR TO THE FIRM I. G. FARBENINDUSTRIE AKTIENGESELLSCHAFT, OF FRANKFORT-ON-THE-MAIN, GERMANY.

PROCESS OF REFINING LIGHT METALS SUCH AS MAGNESIUM OR ALUMINUM OR THEIR ALLOYS AND RECOVERING SUCH METALS FROM SCRAP.

No Drawing. Application filed April 4, 1927, Serial No. 180,991, and in Germany January 15, 1926.

This invention relates to the recovering and refining of light metals such as magnesium or aluminum or their alloys.

In my U. S. Patent No. 1,576,080 I have described a method of recovering such metals from scrap according to which the material is melted with magnesium chloride and a substance adapted to act as a thickening medium upon magnesium chloride. By "thickening media" are meant substances incapable of forming low-melting eutectics with molten magnesium chloride (see page 1, lines 40 and 41 of specification No. 1,576,080).

On further investigation I have found, in the first instance, that when using magnesium chloride to which fluorspar has been added as a thickening medium, or, when preparing a stock of refining compound ready for use by melting together magnesium chloride and fluorspar, a transformation of the two salts takes place, and calcium chloride and magnesium fluoride are formed.

Furthermore I have found that, instead of magnesium chloride in connection with fluorspar as a thickening agent, calcium chloride with the addition of calcium fluoride or fluorspar may be employed. This is due to the fact that also in this case fluorspar acts as a thickening medium either directly or indirectly, as, at temperatures exceeding the limit of about 650° C., which are to be employed, a calcium fluoride primarily separates from a melt of calcium chloride containing more than 18% of calcium fluoride, until the eutectic point of about 650° C. has been reached, whereas, from mixtures containing less than 18% of calcium fluoride, calcium chloride is primarily separated, acting as a thickening medium.

For instance, at 650° C., from 100 parts of a melt containing 9% of calcium fluoride 50 parts of calcium chloride will be primarily separated, and 50 parts of eutectic containing 18% of calcium fluoride remains as a melt. In this way I may, with a view of the well-known melting-diagram of the salt mixture, select the appropriate composition, i. e. the proper degree of thickening according to the temperature to which the metal is to be heated. The use of the less regulable mixtures approximating the percentage of the eutectic (18% of calcium fluoride) should be avoided.

From the foregoing it appears that the peculiar effect of the calcium fluoride upon which my invention is based essentially differs from that which is generally produced by adding fluorspar to easily melting salt mixtures which serve for embedding and coating the metals to be melted down. In these known cases the object of adding fluorspar is to facilitate the metal's flowing together to a uniform regulus. In the present case the quantity of the molten salts does not suffice for a similar purpose, because my present invention is carried out in accordance with the U. S. Patents Nos. 1,524,470 and 1,576,080. Therefore, fluorspar is used in this case not as a flux, but as a thickening medium for attaining a certain viscosity of the melt.

I claim:—

The process of refining light metals such as magnesium or aluminum or their alloys, which comprises melting the impure metal to be treated, adding calcium chloride and calcium fluoride in such proportions that the proximity of the eutectic point—82% of calcium chloride to 18% of calcium fluoride—is avoided, stirring the mixture and separating the molten metal from the foreign substances.

In testimony whereof I affix my signature.

ADOLF BECK.